United States Patent [19]
Wong

[11] 3,757,565
[45] Sept. 11, 1973

[54] NON-CONTACT VIBRATION VELOCITY APPARATUS

[75] Inventor: Thomas Y. Wong, Schenectady, N.Y.

[73] Assignee: General Electric Company, Schenectady, N.Y.

[22] Filed: Feb. 22, 1972

[21] Appl. No.: 228,182

[52] U.S. Cl. ............................................. 73/71.4
[51] Int. Cl. ......................................... G01n 29/00
[58] Field of Search ..................................... 73/71.4

[56] References Cited
UNITED STATES PATENTS
| | | | |
|---|---|---|---|
| 3,610,029 | 10/1971 | Carlson | 73/71.4 |
| 3,148,537 | 9/1964 | Berwin et al. | 73/71.4 |
| 3,486,375 | 12/1969 | Redwine et al. | 73/71.4 |

Primary Examiner—Richard C. Queisser
Assistant Examiner—Arthur E. Korkosz
Attorney—William C. Crutcher et al.

[57] ABSTRACT

A non-contact device for measuring and monitoring vibrational velocity of a rotating shaft including a displacement probe positioned immediately above the surface of the shaft for generating an electrical displacement signal proportional to the instantaneous standoff distance between the probe and the shaft surface. The electrical signal is coupled to an active network which takes the derivative of the components of the displacement signal below a selected value and which takes the integral of the components of the displacement signal above a selected value. The output of the active network therefore is only a function of the low frequency components of the signal which, in turn, are indicative of velocity of the mass center of the shaft. Suitable circuitry is provided to display the output of the active network.

4 Claims, 6 Drawing Figures

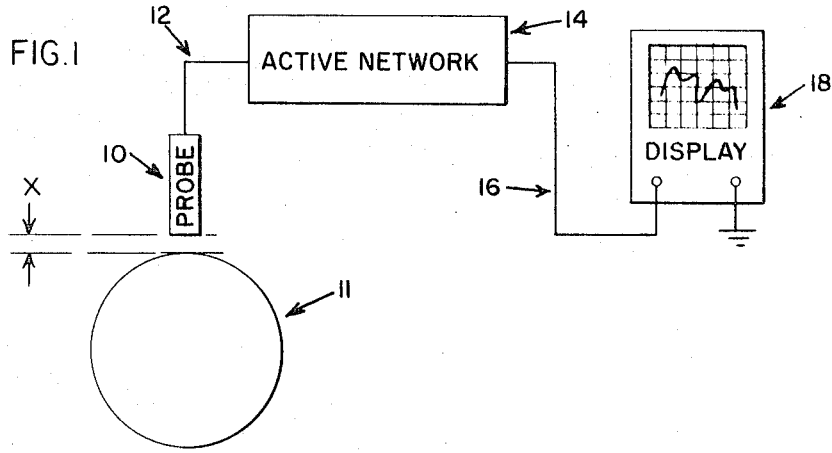
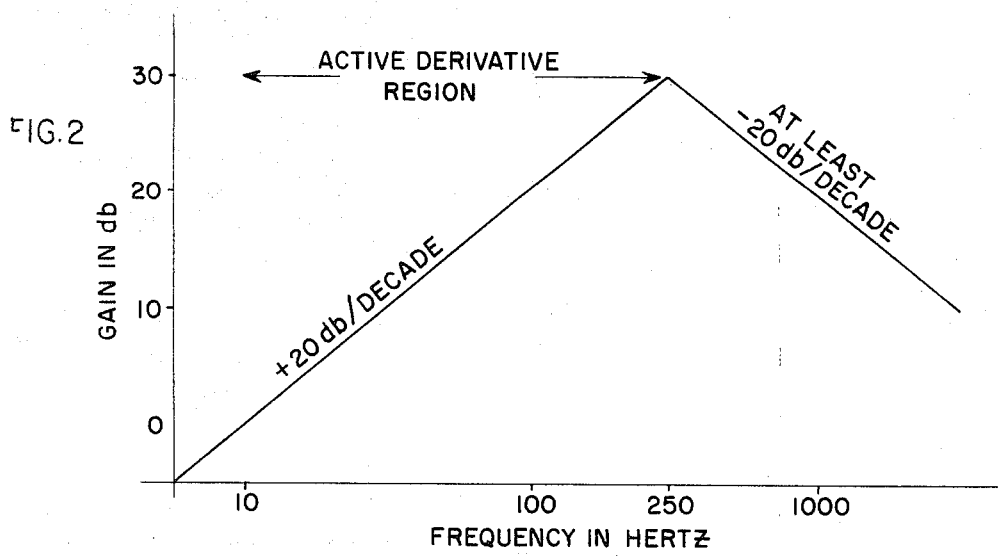
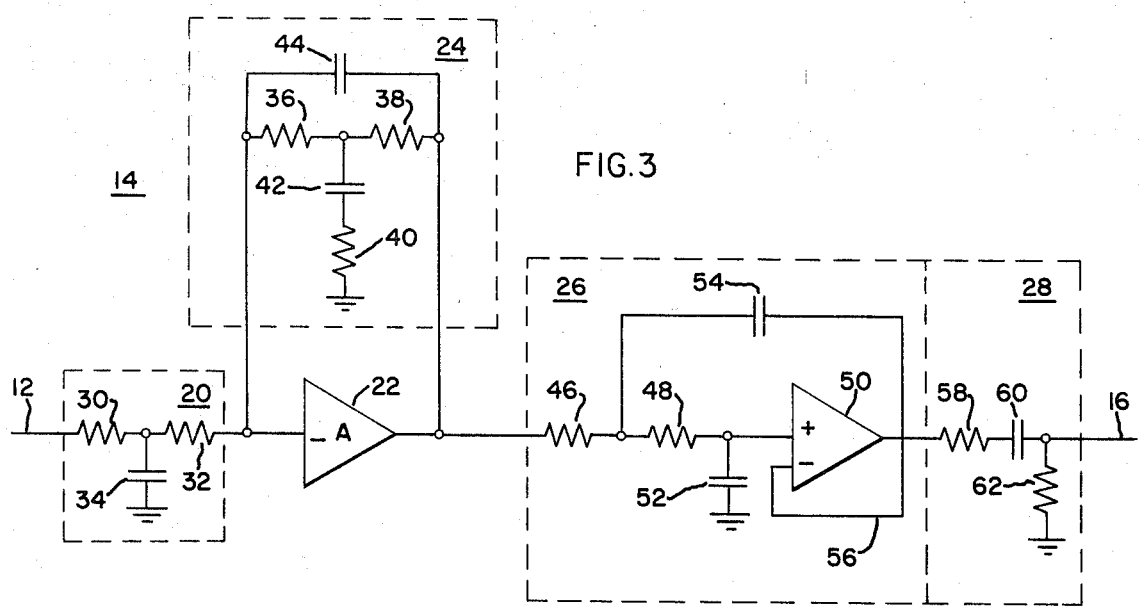

Patented Sept. 11, 1973

20-200 Hz RANGE 20-400 Hz RANGE 20-600 Hz RANGE

NON-CONTACT VIBRATION VELOCITY APPARATUS

BACKGROUND OF THE INVENTION

Mechanical vibration measurement and monitoring is useful for extending the life of mechanical equipment by locating destructive vibration sources before extensive damage is done to the equipment. Consequently, a significant amount of work has been devoted over the years toward trying to develop reliable and accurate devices for translating mechanical vibrations into measurable electrical signals.

In general, devices which have been developed fall into two broad categories: velocity measuring devices which make contact with vibrating equipment, and displacement measuring devices which do not make contact with the vibrating equipment. There are, of course, advantages and disadvantages to each group.

The velocity measuring devices were the first to be developed, and they usually comprise a seismic velocity transducer mounted directly to the vibrating equipment, which transducer experiences a change in an electrical parameter in response to the velocity of the vibrating equipment. For example, U.S. Pat. No. 1,961,007, issued to Harry Marvin and assigned to the assignee of the present application, teaches the use of rod having one end adopted to make contact with a vibrating body and having another end of the rod equipped with a magnetic means for generating a voltage substantially directly proportional to the velocity of the translational motion of the rod.

Velocity measuring devices, such as the one referred to above, theoretically should give a good indication of the energy involved in causing vibrations since the square of the velocity of the mass center of a vibrating object is proportional to the kinetic energy of the vibrating forces. Also, the product of the mass center velocity and angular frequency of rotation of a shaft is a direct indication of the forces involved which cause vibration in rotating equipment. For example, the destructive force in a bearing housing increases linearly with either mass center velocity or angular frequency of rotation.

A major problem exists with newer machines which have lightweight rotors in that seismic velocity transducer which come in contact with such rotors will not give a true vibration indication. This is true because the mass of the transducer changes the form or mass of the vibrating object, thereby causing changes in the vibration pattern of the object resulting in measurements that do not resemble the initial vibration pattern. Furthermore, the prior art velocity type transducer have poor response and low amplitude output signals at low frequencies and at low amplitudes of vibration due to the inertia of the transducer.

To overcome the difficulties of contact velocity devices, non-contact displacement devices were developed to generate a voltage proportional to the instantaneous standoff distance between the surface of a vibrating object and a fixed point above the surface. These devices have the advantage of not contacting the vibrating object and therefore they do not disturb the vibration patterns as do velocity contact devices. Examples of such devices may be found in U.S. Pat. No. 3,180,136 and 3,512,402, both issued to George B. Foster.

On the other hand, non-contact displacement devices found in the prior art do not, as far as can be determined, measure the most suitable parameter-velocity. In addition, devices of the non-contact displacement type are extremely sensitive to variations in the standoff distance and therefore extensive calibration equipment is needed to continuously calibrate the absolute value of the standoff distance.

The present invention is directed toward an apparatus which accurately monitors the most useful parameter, velocity, while at the same time avoiding contact with the vibrating equipment. Furthermore, the present invention effectively filters out high frequency velocity components which are associated merely with noise from other sources or surface noise on the rotating shaft, and concentrates only on lower frequency velocity components which are associated with destructive vibration forces within the vibrating equipment.

SUMMARY OF THE INVENTION

It is therefore an object of the present invention to provide a new and improved means for measuring and monitoring mechanical vibrations.

A further object of the present invention is to provide a means for measuring and monitoring mechanical vibrations by a signal indicative of the mass center velocity of a vibrating object without contacting the object.

Another object of the present invention is to provide a means for deriving a signal indicative of velocity of the mass center of a rotating shaft which is sensitive to low frequency and low amplitude vibrations.

Another object of the present invention is to provide a means for measuring and monitoring mechanical vibrations in a rotating shaft which does not require continuous calibration of the absolute value of the standoff distance between the means and the object being measured.

Yet another object of the present invention is to provide an efficient and effective means for measuring and monitoring low frequency vibration and for filtering out high frequency vibrations.

Further objects and advantages of the invention will be apparent to those skilled in the art, from the following description, taken in conjunction with the attached drawing.

The non-contact vibration velocity apparatus described in detail below is used, for example, in conjunction with monitoring vibrations in a rotating shaft. According to the present invention, the vibration velocity apparatus comprises at least one non-contact displacement probe which is positioned adjacent but spaced from the rotating shaft. The displacement probe is used to supply electrical displacement signals proportional to the instantaneous standoff distance between the probe and the surface of the shaft. The vibration velocity apparatus also comprises an active network connected to the displacement probe which active network generates electrical velocity signals proportional to the derivative of the displacement signals within a selected range of frequencies.

Furthermore, the active network is designed in one disclosed embodiment to take the derivative only of those displacement signals below a selected cutoff frequency. In another embodiment, the active network also generates the integral of those displacement signals above the selected cutoff frequency. Therefore, velocity signals from the active network comprise essentially only those velocity signals indicative of destructive vibrational forces affecting the rotating shaft and not higher frequency velocity signals generally associated with noise generated by the rotating shaft or other sources.

BRIEF DESCRIPTION OF THE DRAWINGS

For a fuller understanding of the invention reference is made to the detailed description below when taken with the drawings wherein:

FIG. 1 is a simplified block diagram of the present invention.

FIG. 2 is a log magnitude (or Bode) plot which represents the ideal gain characteristics of one embodiment of the present invention.

FIG. 3 is a diagram of one embodiment of the active network of the present invention.

DESCRIPTION OF THE INVENTION

Figure 4:
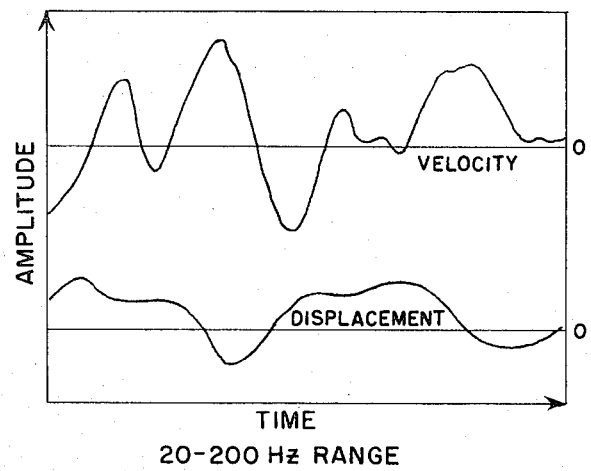
FIGS. 4, 5 and 6 are graphs which illustrate the output of the embodiment illustrated in FIG. 3 taken with several different cutoff frequencies.

The non-contact vibration velocity apparatus of the present invention is illustrated in simplified block diagram form in FIG. 1. The apparatus comprises a non-contact displacement probe positioned immediately above and spaced from the surface of a rotating shaft 11. An output from probe 10 is connected by line 12 to an input of active network 14 and an output of active network 14 is connected by line 16 to an input of display means 18. A second probe (not shown) mounted 90° from probe 10 and supplying a second channel in network 14 and display means 18 will be required in order to give a complete analysis of "absolute" velocity.

As the shaft 11 rotates, the distance between shaft 11 and probe 10, designated as "x", varies dependent on the vibrational forces exerted on shaft 11. Probe 10 operates to measure the instantaneous value of distance "x" and generate a proportional electrical displacement signal over line 12.

Most any non-contact displacement probe can be employed as probe 10. Two probes which have been used and tested in conjunction with the teachings of the present invention are currently manufactured by the Bently Nevada Corporation of Minden, Nevada and are currently referred to as 302 and 304 probes. The use of a non-contact displacement probe assures that the original vibration pattern set up in rotating shaft 11 will not be disturbed by contact of a probe with the shaft.

The present invention also incorporates the advantages discussed above of indicating mass center velocity by utilizing active network 14 which takes the derivative of the displacement signal on line 12 in a selected frequency range and generates a derivative or velocity signal in line 16 for display by display means 18, the latter being well known in the art.

A perfectly round shaft rotating without movement in the bearing journal has a center of mass which does not move in space, i.e., it has zero absolute velocity. It has been found that unbalance, misalignment of couplings or bearings, bent shafts and eccentric journals usually cause periodic movement of the mass center with a frequency of vibration in shaft 11 equal to a multiple of the revolutions per minute of the shaft. Mechanical looseness usually causes a frequency of vibration equal to two times the revolutions per minute of the shaft, or the second harmonic of the frequency of rotation. Therefore, low frequency velocity signals associated with the above-mentioned low frequency vibrations are of highest interest in locating destructive forces.

On the other hand, gear noise results in vibrations having frequencies equal to a very large multiple of the revolutions per minute of the shaft. Also, shaft surface noise due to scratches or multiple surface imperfections produce high frequency components which would give a false indication of mass center movements. These high frequency velocity signals associated with gear noise and other surface noise are most desirably filtered out.

In view of the above discussion, in one embodiment of the present invention active network 14 operates to take the derivative only of those displacement signals on line 12 below a selected frequency and thereby concentrates on generating only those velocity signals which are associated with destructive vibration forces exerted on shaft 11, these normally being the fundamental and second harmonics of the shaft rotation frequency. In addition, an embodiment of active network 14 disclosed below integrates those displacement signals on line 12 above a selected frequency and thereby effectively filters out high frequency components which are associated merely with gear and surface noise associated with rotating shaft 11.

The relationship between the displacement signals on line 12 and the velocity signal on line 16 is most readily apparent when it is understood that the vibration patterns in rotating shaft 11 are represented by complicated wave forms. Furthermore, a characteristic of the displacement signal on line 12 is that the displacement signal is the sum of all the vibration modes of rotating shaft 11. The displacement signal therefore is a periodic and continuous function of time.

Fourier has proven that such a complicated function as the displacement signal can be represented by a trigonometric series which in its simplest form may be written as:

$$x(t) = A_1 \text{Sin } a_1 \pm A_2 \text{Sin } a_2 \, wt \pm \ldots \pm A_n \text{Sin } a_n \, wt \tag{1}$$

where: $x(t)$ is the displacement signal on line 12 as a function of time, $A_1, A_2 \ldots A_n$ are magnitude coefficients of respective Fourier harmonics, $w$ is the angular speed of rotating shaft 11, and $a_1, a_2 \ldots a_n$ are integer multiples of $w$.

To obtain velocity, one must take the derivative of equation (1):

$$d\,[x(t)]/(dt) = v(t) = A_1 \, a_1 \, w \text{ Cos } A_1 \, wt - A_2 \, a_2 \, w \text{ Cos } A_2 \, wt - \ldots A_n \, a_n \, w \text{ Cos } A_n \, wt. \tag{2}$$

By examining equations (1) and (2), it may be seen that to concentrate effectively on only low frequency components of vibration, it is necessary to differentiate only those components of displacement below a selected frequency. In addition, frequency components of vibration which are associated with noise may be effectively filtered by taking the time integral of those components of displacement above a selected frequency.

For example, if shaft 11 has a maximum speed of 6,600 RPM, or 110 Hz. in terms of frequency, then to detect vibrations at a maximum frequency of two times the revolutions per second of the shaft, it is desirable to limit differentiation to those displacement signals having a frequency component no greater than 110 × 2 which equals 220 Hz. As a matter of convenience and to assure that all displacement signals at 220 Hz will be differentiated, it is suggested the cutoff frequency be set a little higher, as for example at 250 Hz.

FIG. 2 is a log magnitude (Bode) plot representing the ideal gain characteristics of one embodiment of active network 14. In the frequency range of 10 to 250 Hz the gain of the active network 14 has a +20 db/decade slope. From a well known theory by Bode, it is known that a +20 db/decade slope on a log magnitude plot represents a first order derivative function. The frequency of 250 Hz has been selected as a cutoff frequency. Beyond 250 Hz, the graph illustrates at least a —20 db/decade slope. A —20 db/decade slope represents a first order integration function and greater negative slopes represent higher orders of integration. It is to be understood that any suitable cutoff frequency may be selected and that the higher the order of integration function chosen above the cutoff frequency, the more effective the filtering.

Log magnitude plots and Bode theory are well known to those skilled in the art. The difficulty comes in developing an active network which exhibits the particular characteristics represented by the graph in FIG. 2. According to the present invention such an active network is illustrated in FIG. 3. It is to be understood that theoretically an infinite number of circuits could exhibit the characteristics of FIG. 2 and that the active network in FIG. 3 is presented as an illustrative example of one circuit that has been proven to work satisfactorily.

The active network 14 in FIG. 3 comprises an input network 20, an amplifier 22 having a feedback network 24, filter network 26 and an output network 28.

Input network 20 comprises a resistor 30 and a resistor 32 connected together at a point to form a series circuit. The free end of resistor 30 is connected to line 12 from probe 10 and the free end of resistor 32 connected to a negative input of amplifier 22. A capacitor 34 is shunted between ground and the point where resistors 30 and 32 are connected together.

Feedback network 24 comprises resistors 36 and 38 connected together at a point to form a series circuit with the free end of resistor 36 connected to the negative input of amplifier 22 and the free end of resistor 38 connected to an output of amplifier 22. A resistor 40 is connected in series with a capacitor 42 and the series is shunted between ground and the point where resistors 36 and 38 are connected together. A capacitor 44 is shown connected in parallel with the series connection of resistors 36 and 38. This type of network 24 in its more general sense is well known in the art as a bridge-T network.

Filter network 26 comprises a resistor 46 and a resistor 48 connected together at a point to form a series circuit with the free end of resistor 46 connected to the output of amplifier 22 and the free end of resistor 48 connected to a positive input of an amplifier 50. A capacitor 52 is shunted from the positive input of amplifier 50 to ground and a capacitor 54 is connected from the point at which resistors 46 and 48 are connected together to the output of amplifier 50. Line 56 connects the output of amplifier 50 to a negative input of amplifier 56.

Output network 28 comprises a resistor 58 and a capacitor 60 connected together in series with the free end of resistor 58 connected to the output of amplifier 50 and the free end of capacitor 60 connected to line 16. A resistor 62 is shunted from line 16 to ground. One set of values are: 200 ohms, for resistor 65, 7.2K ohms for resistor 62, and 30 microfarads for capacitor 60.

In operation, input network 20 is a low pass filter which has a cutoff frequency of about 2,500 Hz when resistors 30 and 32 are 10K ohms and capacitor 34 is valued at 0.001 microfarads. Input network 20 therefore passes only those components of the displacement signal on line 16 which have a frequency below 2,500 Hz. Should it be desired, input network 20 may be removed from active network 14 and active network 14 will still function to a high degree.

Filter network 26 may be found described in S. K. Mitra's book *Analysis and Synthetic of Linear Active Networks*, 1969 edition, John Wiley, publisher. The discussion on page 329 of Mitra's book provides an outline of how to select the values of resistors 46 and 48 and capacitors 52 and 54 to assure a flat response up to a selected frequency and an integration function for filtering higher frequencies. As discussed above, the cutoff frequency can be set at 250 Hz, thereby eliminating vibration componets associated with gear and shaft surface noise.

The combination of amplifier 22 and feedback network 24 can be taken alone to form one embodiment of active network 14 which generates velocity signals on line 16 from the displacement signals on line 12.

For example, when resistors 36 and 38 have values of about 31K ohms each, capacitor 42 has a value of about 2 microfarads, capacitor 40 has a value of about 50 microfarads and amplifier 22 is a Fairchild type 741 operational amplifier, then the combination of amplifier 22 and feedback network 24 forms a means for differentiating displacement signals over a range of frequencies from 10 Hz to approximately 600 Hz, and the combination further forms a means for integrating displacement signals having frequencies above 600 Hz. Said another way, when the components in feedback network 24 have the values suggested above, the combination of amplifier 22 and feedback network 24 has a response in the 10 Hz to 250 Hz range which almost precisely matches the +20 db/decade straight line plot in FIG. 2. For frequencies above 600 Hz, the combination has a response which could be represented by a —20 db/decade slope on FIG. 2.

When amplifier 22 and feedback network 24 are taken in combination with input network 20, filter network 26 and output network 28, the combination forms another embodiment of active network 14, which combination can be made to have a response almost precisely matching the entire graph in FIG. 2. For example, when the cutoff frequency of filter network 26 is set at 250 Hz, as discussed above, then active network 14 differentiates displacement signals between the frequencies of 10 Hz and 250 Hz and filters displacement signals above 250 Hz with a greater than first order integration.

It may be seen that the present invention as described above monitors that most useful parameter, velocity, while at the same time avoiding contact with vibrating shaft 11. The present invention effectively filters out high frequency velocity components which are associated merely with noise generated by the rotating shaft. The present invention monitors the rate of change of the displacement signal and therefore does not require extensive calibration equipment to continuously calibrate the absolute value of displacement.

A non-contact vibration velocity apparatus has been built according to the above teachings for the following frequency spectrums:

a. 20 – 200 Hz
b. 20 – 400 Hz
c. 20 – 600 Hz

Figure 5:
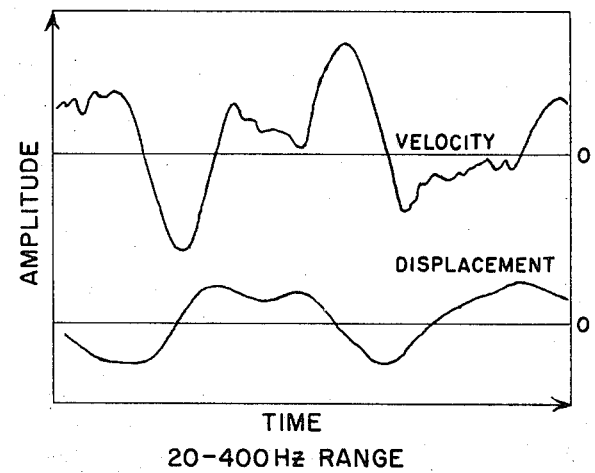
Figure 6:
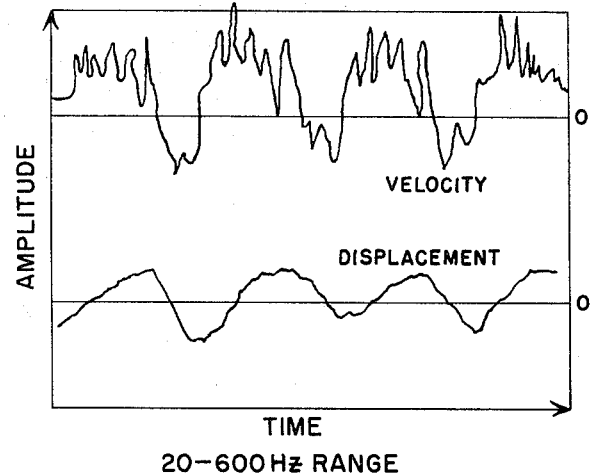

The frequency spectrums are determined primarily by the cutoff frequency of integrating network 26. FIGS. 4–6 show representative input displacement signals and output velocity signals for circuits (a) – (c) respectively. The plotted curves contain a phase shift between the displacement curve and the velocity which is immaterial as far as this analysis is concerned.

FIG. 4 illustrates an input displacement signal and output velocity signal on display means 18 when active network 14 differentiates over a 20 – 200 Hz range. A 200 Hz cutoff gave excellent rejection of the electrical and shaft surface noise. FIG. 4 shows that the velocity of the fundamental shaft vibration mode is clean and smooth.

FIG. 5 illustrates a displacement signal and an input velocity signal on display means 18 when active network 14 differentiates over a 20 – 400 Hz range. A 400 Hz cutoff revealed a higher order harmonic than that obtained with a 200 Hz cutoff. The fundamental vibration mode is still clear and well defined.

FIG. 6 illustrates an input displacement signal and an output velocity signal on display means 18 when active network 14 differentiates over a 20 – 600 Hz range. A 600 Hz cutoff reveals pronounced high order vibration modes riding on the fundamental velocity modes pictured in FIGS. 4 and 5. The high order vibrations may be due to an uneven surface of shaft 11, such as a scalloped shaft. Insignificant high frequency vibration or shaft noise such as that shown in FIG. 6 can be filtered out by lowering the cutoff frequency as shown in FIGS. 4 and 5.

It will be understood that various changes may be made in detail within the scope of my claims without departing from the spirit of my invention. It is therefore understood that my invention is not to be limited to the specific details shown and described.

What is claimed is:

1. An apparatus for monitoring vibrations of an object comprising:
    means for generating a displacement signal proportional to the instantaneous distance between an object and said means without contacting said object; and
    an active network connected to receive said displacement signal, said network including means for providing a positive 20 db/decade slope characteristic on a Bode plot from around 10 Hz to a selected frequency and means for providing at least a negative 20db/decade slope characteristic on a Bode plot for frequencies above said selected frequency.

2. The combination claimed in claim 1 wherein said object is a rotating shaft portion and wherein said selected frequency is slightly greater than the second harmonic of the frequency of rotation of said shaft portion.

3. An apparatus for monitoring vibrations of an object comprising:
    a non-contact probe which generates a displacement signal proportional to the instantaneous distance between said probe and an object;
    an active network for differentiating said displacement signal over a selected range of frequencies to generate a velocity signal indicating the velocity of the mass center of said object with respect to said probe over said frequency range;
    said active network including an operational amplifier, said amplifier having a negative input connected to receive said displacement signal and having an output at which said velocity signal is generated;
    said active network further including a feedback network having:
    a. first and second resistors connected together at a point to form a series circuit with said first resistor having a free end connected to said negative input of said amplifier and said second resistor having a free end connected to said output of said amplifier;
    b. a first capacitor and a third resistor connected together to form a series circuit with said first capacitor having a free end connected to said point and said third resistor having a free end connected to ground; and
    c. a second capacitor having one end connected to said input of said amplifier and having another end connected to said output of said amplifier.

4. An apparatus for monitoring vibrations of an object comprising:
    a non-contact probe which generates a displacement signal proportional to the instantaneous distance between said probe and an object;
    an active network including means for differentiating said displacement signal over a selected range of frequencies to generate a velocity signal indicating the velocity of a mass center of said object with respect to said prrobe over said frequency range; and
    said active network further including means for integrating said displacement signal comprising a filter network having an input connected to an output of said means for differentiating and having a response which is flat for signals over said selected frequency range and which response is the integral of signals having a frequency above said selected range.

* * * * *